United States Patent
Caine et al.

(10) Patent No.: US 11,900,173 B2
(45) Date of Patent: Feb. 13, 2024

(54) CONTAINER RUNTIME OPTIMIZATION

(71) Applicant: KYNDRYL, INC., New York, NY (US)

(72) Inventors: Jeremy Caine, Sydney (AU); Robert Brodie, Pagewood (AU); Gregory R. Hintermeister, Rochester, MN (US); Francis Yew Hong Lee, Singapore (SG)

(73) Assignee: Kyndryl, Inc., New York, NY (US)

( * ) Notice: Subject to any disclaimer, the term of this patent is extended or adjusted under 35 U.S.C. 154(b) by 459 days.

(21) Appl. No.: 17/303,000

(22) Filed: May 18, 2021

(65) Prior Publication Data

US 2022/0374282 A1    Nov. 24, 2022

(51) Int. Cl.
G06F 9/50       (2006.01)
G06F 9/48       (2006.01)
G06F 9/455      (2018.01)

(52) U.S. Cl.
CPC ........ G06F 9/5077 (2013.01); G06F 9/45529 (2013.01); G06F 9/45558 (2013.01); G06F 9/4881 (2013.01); G06F 2009/4557 (2013.01); G06F 2209/505 (2013.01)

(58) Field of Classification Search
None
See application file for complete search history.

(56) References Cited

U.S. PATENT DOCUMENTS 9,588,788 B1 *  3/2017  Ramalingam ....... G06F 9/45558
9,817,648 B2 *  11/2017 Kirkpatrick ......... G06F 9/44521
9,886,307 B2 *  2/2018  Hildrum ............... G06F 9/5011
9,910,713 B2 *  3/2018  Wisniewski .......... G06F 9/5055
10,521,242 B2 * 12/2019 Kirkpatrick ......... G06F 9/44521
10,756,995 B2 *  8/2020 Schibler .............. G06F 9/45558
10,764,202 B2 *  9/2020 Wu ........................ H04L 67/566
10,776,743 B2 *  9/2020 Garrard ................ G06F 40/186
10,810,003 B2 * 10/2020 Gainsborough .......... G06F 8/65

(Continued)

FOREIGN PATENT DOCUMENTS

CN      109542605 A      3/2019
WO   WO-2019200102 A1 * 10/2019 ............. G06F 21/55

OTHER PUBLICATIONS

3 Supervision Principles; http://erlang.org/documentation/doc-4.9.1/doc/design_principles/sup_princ.html; retrieved from the Internet Mar. 15, 2021; 7 pages.

(Continued)

*Primary Examiner* — Van H Nguyen

(57) ABSTRACT

A method, system, and computer program product for implementing container runtime optimization and execution is provided. The method includes enabling a container management instance and a container runtime comprising specified operational attributes associated with a container. Supervisor tree code is embedded within the container runtime and definition software is executed. The definition software describes specified digital endpoints of an associated application process being executed by the container. The container is enabled for operational functionality and an external interface is enabled for communications with the supervisor tree code. The container management instance is executed in response to a command received via the external interface.

20 Claims, 8 Drawing Sheets

(56) References Cited

U.S. PATENT DOCUMENTS

| | | | | |
|---|---|---|---|---|
| 11,163,593 | B2* | 11/2021 | Lin | G06F 8/443 |
| 11,263,130 | B2* | 3/2022 | Hellyer | G06F 12/0253 |
| 11,321,141 | B2* | 5/2022 | Rafey | G06N 20/00 |
| 11,513,864 | B2* | 11/2022 | Koppes | G06F 9/5072 |

OTHER PUBLICATIONS

Chekin, Pavel; Kubernetes multi-container pods and container communication; https://www.mirantis.com/blog/multi-container-pods-and-container-communication-in-kubernetes/; Aug. 27, 2017; 24 pages.

Chilingarov, Gaspar; Supervisors and workers in 10 minutes;https://medium.com/learn-elixir/supervisors-and-workers-in-10-minutes-83fbad6f16d1 Jul. 17, 2017; 12 pages.

Connections; https://mongoosejs.com/docs/connections.html#connection-events; retrieved from the Internet Mar. 15, 2021; 12 pages.

Grunert, Sascha; Demystifying Containers—Part I: Kernel Space; https://medium.com/@saschagrunert/demystifying-containers-part-i-kernel-space-2c53d6979504; Mar. 19, 2019; 26 pages.

Grunert, Sascha; Demystifying Containers—Part II: Container Runtimes; https://medium.com/@saschagrunert/demystifying-containers-part-ii-container-runtimes-e363aa378f25; Jun. 18, 2019; 20 pages.

Hausenblas, Michael; Kubernetes: A Pod's Life; https://www.openshift.com/blog/kubernetes-pods-life; Oct. 24, 2017; 5 pages.

Jain, Piyush; Docker Container Lifecycle Management: Create, Run, Pause, Stop And Delete; https://k21academy.com/docker-kubernetes/docker-container-lifecycle-management/; Nov. 1, 2020; 11 pages.

Pod Lifecycle; https://kubernetes.io/docs/concepts/workloads/pods/pod-lifecycle/; retrieved from the Internet Mar. 15, 2021; 32 pages.

Shah, Harshal; https://dzone.com/articles/kubernetes-lifecycle-of-a-pod: Kubernetes: Lifecycle of a Pod; Aug. 1, 2017; 6 pages.

Stratoscale; Auto-Healing Containers in Kubernetes; https://www.stratoscale.com/blog/kubernetes/auto-healing-containers-kubernetes/; Apr. 25, 2017; 6 pages.

UNIX Threads; https://www.cs.miami.edu/home/visser/Courses/CSC322-09S/Content/UNIXProgramming/UNIXThreads_shtml; Jan. 22, 2009; 5 pages.

Mell, Peter et al.; "The NIST Definition of Cloud Computing;" National Institute of Standards and Technology; Special Publication 800-145; Sep. 2011; 7 pages.

* cited by examiner

|  | Supervisor - if any child Node disables restart it |
|  | Supervisor - if any child Node disables terminate all Child nodes and restart them |
|  | Worker Node |

CONTAINER RUNTIME OPTIMIZATION

BACKGROUND

The present invention relates generally to optimizing a container runtime and in particular to a method and associated system for improving software and runtime technology.

SUMMARY

A first aspect of the invention provides a container runtime optimization and execution method comprising: enabling, by a processor of a controller hardware device, a container management instance; enabling, by the processor in response to the enabling the container management instance, a container runtime comprising specified operational attributes associated with a container; embedding, by the processor, supervisor tree code within the container runtime; executing, by the processor in response to the enabling the container runtime, definition software describing specified digital endpoints of an associated application process being executed by the container; enabling, by the processor in response to the executing the definition software, the container for operational functionality; enabling, by the processor, an external interface for communications with the supervisor tree code; executing, by the processor in response to a command received via the external interface, the container management instance with respect to the container.

A second aspect of the invention provides a computer program product, comprising a computer readable hardware storage device storing a computer readable program code, the computer readable program code comprising an algorithm that when executed by a processor of a controller hardware device implements a container runtime optimization and execution method, the method comprising: enabling, by the processor, a container management instance; enabling, by the processor in response to the enabling the container management instance, a container runtime comprising specified operational attributes associated with a container; embedding, by the processor, supervisor tree code within the container runtime; executing, by the processor in response to the enabling the container runtime, definition software describing specified digital endpoints of an associated application process being executed by the container; enabling, by the processor in response to the executing the definition software, the container for operational functionality; enabling, by the processor, an external interface for communications with the supervisor tree code; executing, by the processor in response to a command received via the external interface, the container management instance with respect to the container.

A third aspect of the invention provides a controller hardware device comprising a processor coupled to a computer-readable memory unit, the memory unit comprising instructions that when executed by the processor implements a container runtime optimization and execution method comprising: enabling, by the processor, a container management instance; enabling, by the processor in response to the enabling the container management instance, a container runtime comprising specified operational attributes associated with a container; embedding, by the processor, supervisor tree code within the container runtime; executing, by the processor in response to the enabling the container runtime, definition software describing specified digital endpoints of an associated application process being executed by the container; enabling, by the processor in response to the executing the definition software, the container for operational functionality; enabling, by the processor, an external interface for communications with the supervisor tree code; executing, by the processor in response to a command received via the external interface, the container management instance with respect to the container.

The present invention advantageously provides a simple method and associated system capable of optimizing a container runtime.

DETAILED DESCRIPTION

Figure 1:
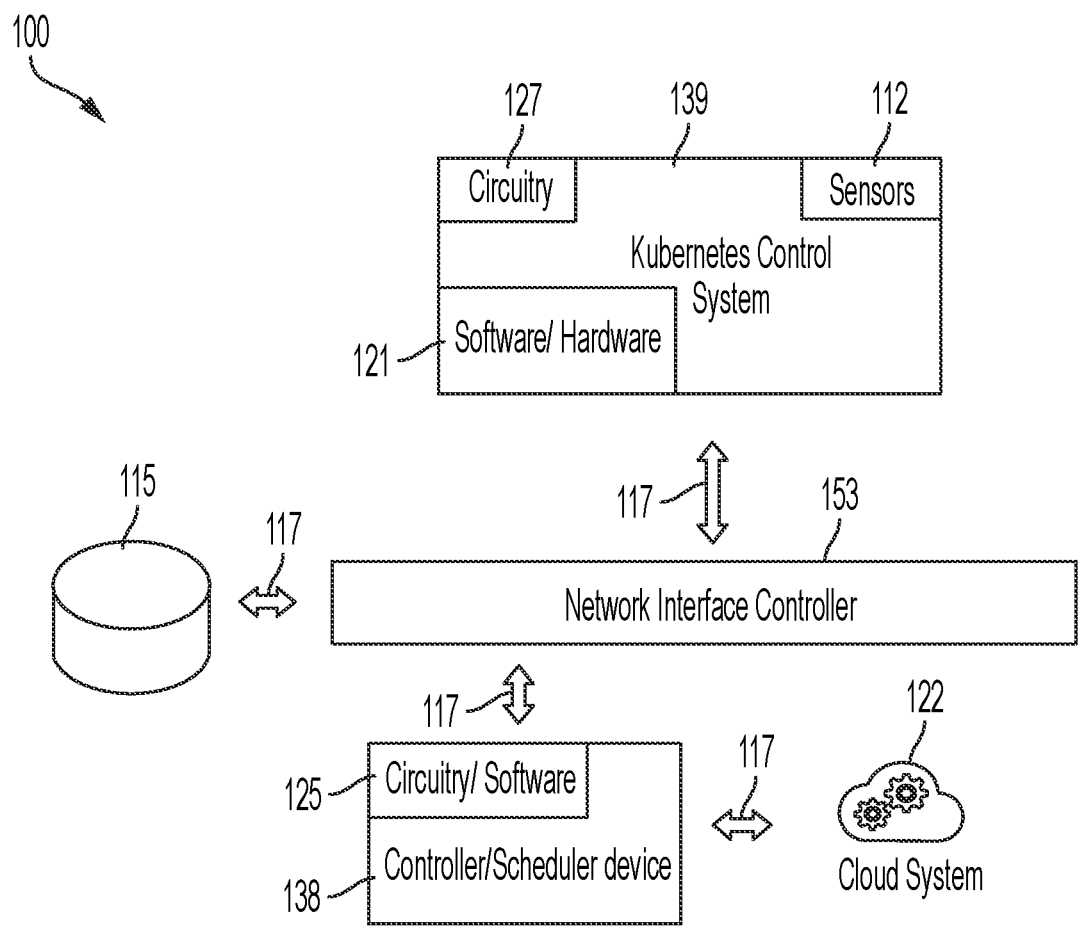
FIG. 1 illustrates a system for improving software technology associated with for improving software and runtime technology associated with embedding supervisor tree code within a container runtime, enabling an associated container for operational functionality, and executing a container management instance with respect to the associated container, in accordance with embodiments of the present invention.

FIG. 1 illustrates a system 100 for improving software and runtime technology associated with embedding supervisor tree code within a container runtime, enabling an associated container for operational functionality, and executing a container management instance with respect to the associated container, in accordance with embodiments of the present invention. A container is defined herein as a standard unit of software configured to package code and all associated dependencies such that an application runs quickly and reliably from one computing environment to another. Typical container (i.e., comprising a runtime environment) management systems (e.g., Kubernetes) are configured to maintain a life of pods (i.e., deployable units of computing created and managed within Kubernetes) via health check processes performed with respect to containers running within an associated pod. A typical instance of a pod may be configured to comprise one or more instances of a container application process launched via a container runtime engine. The container application process comprises one or more operating system processes and associated threads (i.e., a sequence of programmed instructions) controlled by a master (as root or rootless) process. If the container application process within the pod is currently running, then it is declared alive. If a container management system detects that the pod is not alive, then the pod and its associated containers are restarted in accordance with a pod restart policy. A typical pod lifecycle management process is not associated with a comprehensive state machine as a container manager module treats the pod as an entire server machine that is launched by a container runtime as a contained set of processes (i.e., defined during a container build process). When a pod is restarted, an associated machine is rebooted thereby creating a brute force solution to system health issues. Within a pod, a container application typically comprises parent/child tree associated processes and each process may be associated with multiple threads. During execution of parent/child tree associated processes an errant process or thread may cause application degradation that may be presented to a container manager via health probes. Therefore, an application programmer may manually detect errant processing issues and determine whether to modify a health status of a health probe (e.g., liveness, readiness, start-up, etc.). Likewise, a programming burden with respect to reacting and managing in-application events may require externalization with respect to differing pod health statuses. Subsequently, when a programmer does not to manage a fine-grained health status then a burden of managing a pod lifecycle is passed externally to the programmer (intentionally or unintentionally) such that control of the application process is passed to a pod lifecycle manager. Typical application programming models associated with a pod may not be aligned with a brute force restart by a container manager thereby increasing a chance for unresolved system resources (e.g., valuable data within memory that should be persisted to a disk, data within files left in an unreliable state because of a transaction failure, etc.) that are created due to a forced container system shutdown. When the container system is rebooted (after the container system shutdown) during a next start-up of an associated pod clean up function may be required. Likewise, a typical container management system (within large scale cloud systems) may require container manager responsibility for management thereby potentially triggering a large number of health event triggers and causing a significant number of unnecessary pod restarts that collectively (for a hyperscale cloud system) may add up to a noticeable amount of resources performing restart and clean-up operations thereby causing associated server machines to become overworked. Additionally (in the event of a denial of service attack such as pods being disabled), unnecessary workloads may be enabled with respect to a large number of containers being managed to keep an associated pod enabled.

Typical critical systems are not configured for a re-booted during application runtimes as they may be configured to enable a reduced function mode and fix forward approach such that an application developer may typically rely on an execution environment to resolve issues. For example, an alert indicating that a database file system is full may temporarily disable database system processing without disabling an encompassing application periodically uses the database. Additional problems with large scale cloud systems may be associated with critical workloads being deployed to scalable container systems thereby causing functionality within in reduced function mode. Likewise, a typical large-scale brute force approach to disabling and enabling machines (i.e., containers) may require a container orchestration controller to allocate a large amount of time disabling and enabling the machines thereby creating an inefficient system. Therefore, system 100 is configured to abstract a responsibility of fault tolerant application programming from a developer to an environment running the application such that fault tolerance sophistication code is inputted into health management processes for a pod's container lifecycle thereby optimizing an overall efficiency of container management systems. Likewise, system 100 is configured to enable Kubernetes functionality without materially modifying a design and development of container packaging and Kubernetes deployment associated with an application developer.

System 100 enables intra-pod interaction such that Kubernetes are configured to orchestrates pods by orchestrating processes within a pod (across one or more container instances). Rules for orchestrating processes within a pod are integrated into external pod management functions executed via Kubernetes.

An intra-pod orchestrator component may comprise a centralized controller interfacing with one or more containers within a pod. The intra-pod orchestrator component is configured to: manage additional orchestration processes within the pod, marshal consent to Kubernetes orchestration, and execute management actions with respect to a pod level.

System 100 enables an invisible supervisor tree (e.g., supervisor tree code 425 in FIG. 4, infra) attached (via a container runtime) to the container application process. The enabled (invisible) supervisor tree is configured to execute process lifecycle management within the container such that a control function is externalized. Likewise, the supervisor tree is configured to enable mediator functionality with respect to Kubernetes orchestration thereby efficiently managing processes and pod lifecycle management within a Kubernetes based system. An associated container runtime is configured to auto-generate a supervisor tree control process and launch a container application process for execution under the management of the supervisor tree interfacing to the container runtime process. The container runtime process is configured to direct a lifecycle of the application process marshalling the infrastructure control plan (i.e., a scheduler performing operations such as, a kill operation, a restart operation, etc.). Additionally, the container runtime process is configured to direct an application monitoring control plane (e.g., detecting a health status change).

System 100 executes with respect to a pod level such that it controls a process within a container instance as well as across any containers within the pod (e.g., provide HA for a process and if a process 1 is failing in container 1, then failover the process 1 into container 2). System 100 enables supervisor tree benefits across container instances to allow cross-container co-ordination of processes including active/active failover of a failing process across to a process within another container as the process in the first container is restarted thereby increasing an efficiency of a Kubernetes system operating at scale.

System 100 enables a non-invasive technique improvement that may be introduced into an existing Kubernetes operating environment by:
 1. Reducing unnecessary computing and network processing overhead associated with vast numbers of pod lifecycle management events.

2. Increasing a resilience of services offered by a container in a pod via an increased granularity of application processes at an operating system level.

System 100 of FIG. 1 includes a Kubernetes control system 139, a controller scheduler device 138, a cloud system 122, and a database 115 interconnected through a network 7. Kubernetes control system 139 circuitry 127, self learning software/hardware, and sensors 112. Controller scheduler device 138 comprises circuitry/software 125. Kubernetes control system 139 and controller scheduler device 138 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, Kubernetes control system 139 and controller scheduler device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry (e.g., circuitry 127, circuitry/software 125, etc.) may include proprietary specially designed components (e.g., a specialized integrated circuit, such as for example an Application Specific Integrated Circuit (ASIC) designed for only implementing an automated process for improving software and runtime technology associated with embedding supervisor tree code within a container runtime, enabling an associated container for operational functionality, and executing a container management instance with respect to the associated container. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 is configured to combine the benefits of a supervisor tree control process with a container runtime lifecycle management process such that an application developer is enabled to initiate control of a container lifecycle via external devices resulting from events (e.g., status codes) occurring internally within the container (e.g., health statuses of fully functioning, reduced functioning, and/or non-functioning components. In response, a container runtime generates and manages a supervisor tree with respect to a lifecycle declaration. Likewise, supervisor actions are mapped to external container management (e.g., a supervisor restarting all its children can map to a reduced function) external health statuses. A container master (e.g., running as root) process comprises a pseudo-master process such that an actual master process (within the supervisor tree) is controlled by the container runtime. The container master process is configured for overall control of processes running within a container such that a container build is decoupled from a container runtime. Likewise, an application programmer may declare a (operational) health objective specification for container deployment and does not have to specifically program according to the supervisor tree model. A resulting container runtime is configured to initiate a hidden supervisor tree for execution within a lifecycle management process. For example (with respect to a declaration associated with a database connection being disabled), a container runtime and associated supervisor tree organizes internal activity (e.g., re-establishing a connection to the database) with external components (e.g., modifies a status of readiness to pause accepting traffic and updates a status of the readiness upon the connection being re-established).

System 100 is enabled to optimize and improve an efficiency of orchestrating container management with respect to hyperscale by embedding a supervisor tree process (code) into a container runtime for achieving fine grained pod lifecycle management such that processes are managed within a pod (across one or more container instances) and rule are integrated into external pod management functions that provided by Kubernetes. Likewise, a node agent (e.g., a kubelet for Kubernetes) executes container lifecycle management actions with respect to a status action declaration enabled via container supervisor tree code.

Figure 2:
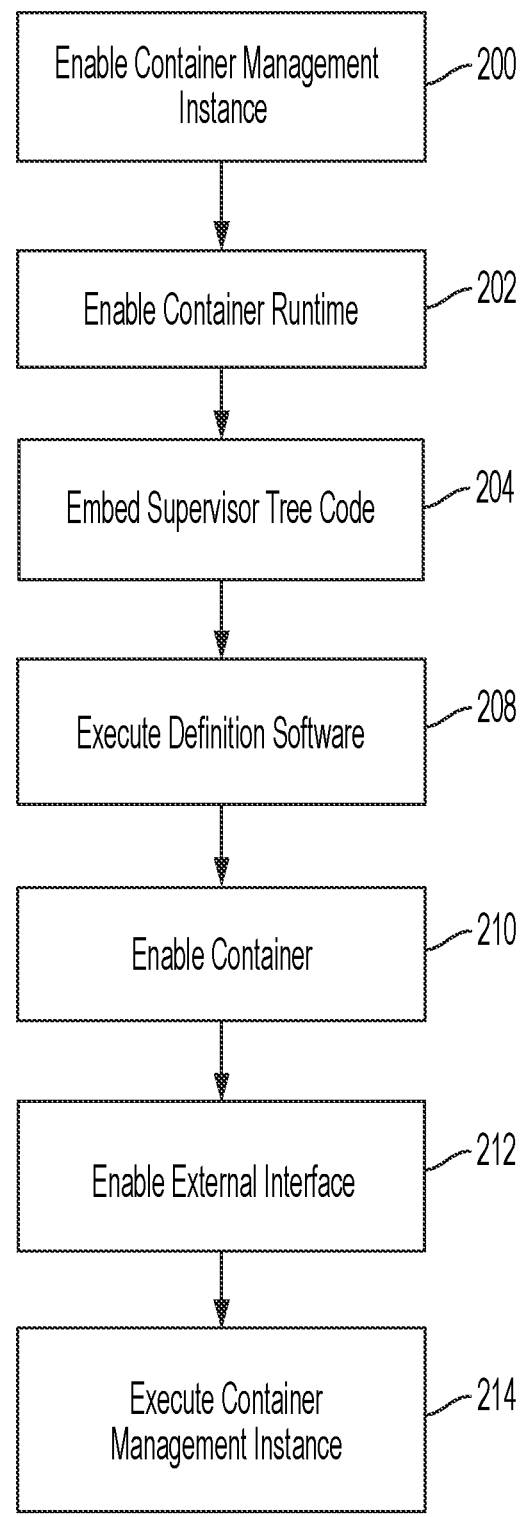
FIG. 2 illustrates an algorithm detailing a process flow enabled by the system of FIG. 1 for improving software and runtime technology associated with embedding supervisor tree code within a container runtime, enabling an associated container for operational functionality, and executing a container management instance with respect to the associated container, in accordance with embodiments of the present invention.

FIG. 2 illustrates an algorithm detailing a process flow enabled by system 100 of FIG. 1 for improving software and runtime technology associated with embedding supervisor tree code within a container runtime, enabling an associated container for operational functionality, and executing a container management instance with respect to the associated container, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by Kubernetes control system 139 and controller scheduler device 138. In step 200, a container management instance is enabled via a controller hardware device (e.g., Kubernetes control system 139 of FIG. 1). The container management instance may be associated with a Kubernetes management system. Enabling the container management instance may include: Deploying a software application with respect to a specified configuration for operation of the container runtime; and assigning a pod of containers to a specified node. The specified node comprises a virtual server or a physical server.

In step 202, a container runtime comprising specified operational attributes associated with a container is enabled in response to results of step 200. Enabling the container runtime may include generating application process instances associated with the container runtime.

In step 204, supervisor tree code is embedded within the container runtime. In step 208, definition software is executed in response to enabling the container runtime. The definition software described specified digital endpoints of an associated application process being executed by the container. Executing the definition software may include dynamically configuring the supervisor code for enabling step 204.

In step 210, the container is enabled for operational functionality. Enabling the container may include:
1. Executing application process code with respect to a set of parent and child system processes instantiated with respect to management of the supervisor tree code.
2. Executing (via the supervisor tree code) rules associated with child system processes of the set (of parent and child system processes) with respect to supervisors or workers of the set.

In step 212, an external interface is enabled for communications with the supervisor tree code. Enabling the external interface may include converting (via the external interface) associated operational actions to specified digital states associated with system processes running within the container.

In step 214, the container management instance is executed with respect to the container in response to a command received via the external interface.

Figure 3:
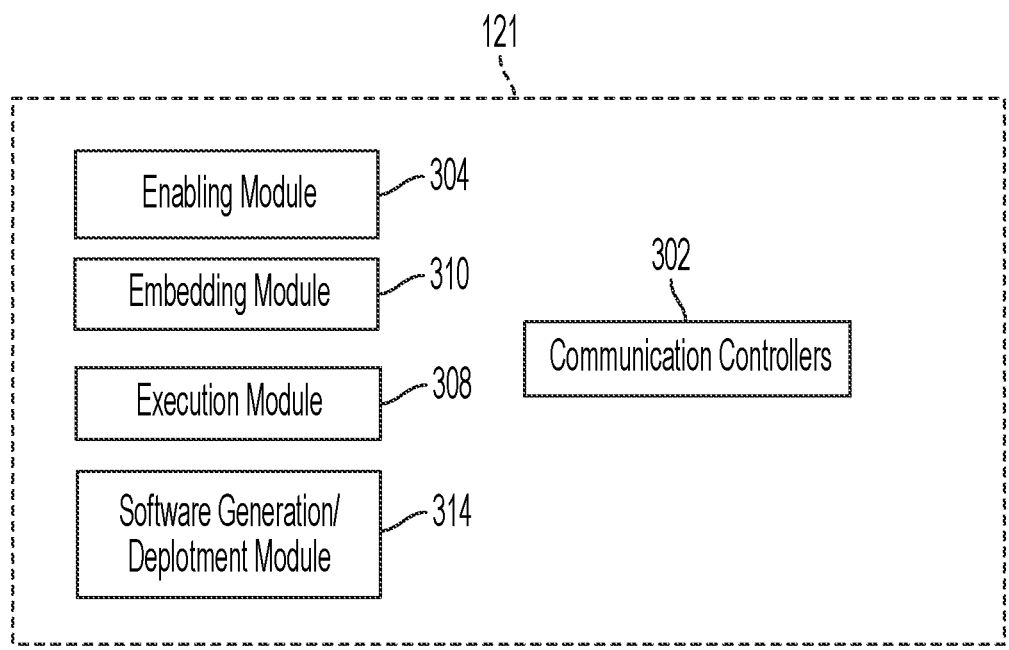
FIG. 3 illustrates an internal structural view of the self-learning software/hardware code/engine of FIG. 1, in accordance with embodiments of the present invention.

FIG. 3 illustrates an internal structural view of self learning software/hardware 121 and/or circuitry/software 125 of FIG. 1, in accordance with embodiments of the present invention. Self learning software/hardware 121 and/or circuitry/software 125 includes an enabling module 304, an embedding module 310, an execution module 308, a software generation/deployment module 314, and communication controllers 302. Enabling module 304 comprises specialized hardware and software for controlling all functions related to enabling steps described with respect to the algorithm of FIG. 2. Embedding module 310 comprises specialized hardware and software for controlling all functionality related to the code embedding steps described with respect to the algorithm of FIG. 2. Execution module 308 comprises specialized hardware and software for controlling all functions related to the execution steps of FIG. 2. Software generation/deployment module 314 comprises specialized hardware and software for controlling all functions related to the software generation and deployment steps of the algorithm of FIG. 2. Communication controllers 302 are enabled for controlling all communications between enabling module 304, embedding module 310, execution module 308, and software generation/deployment module 314.

Figure 4A:
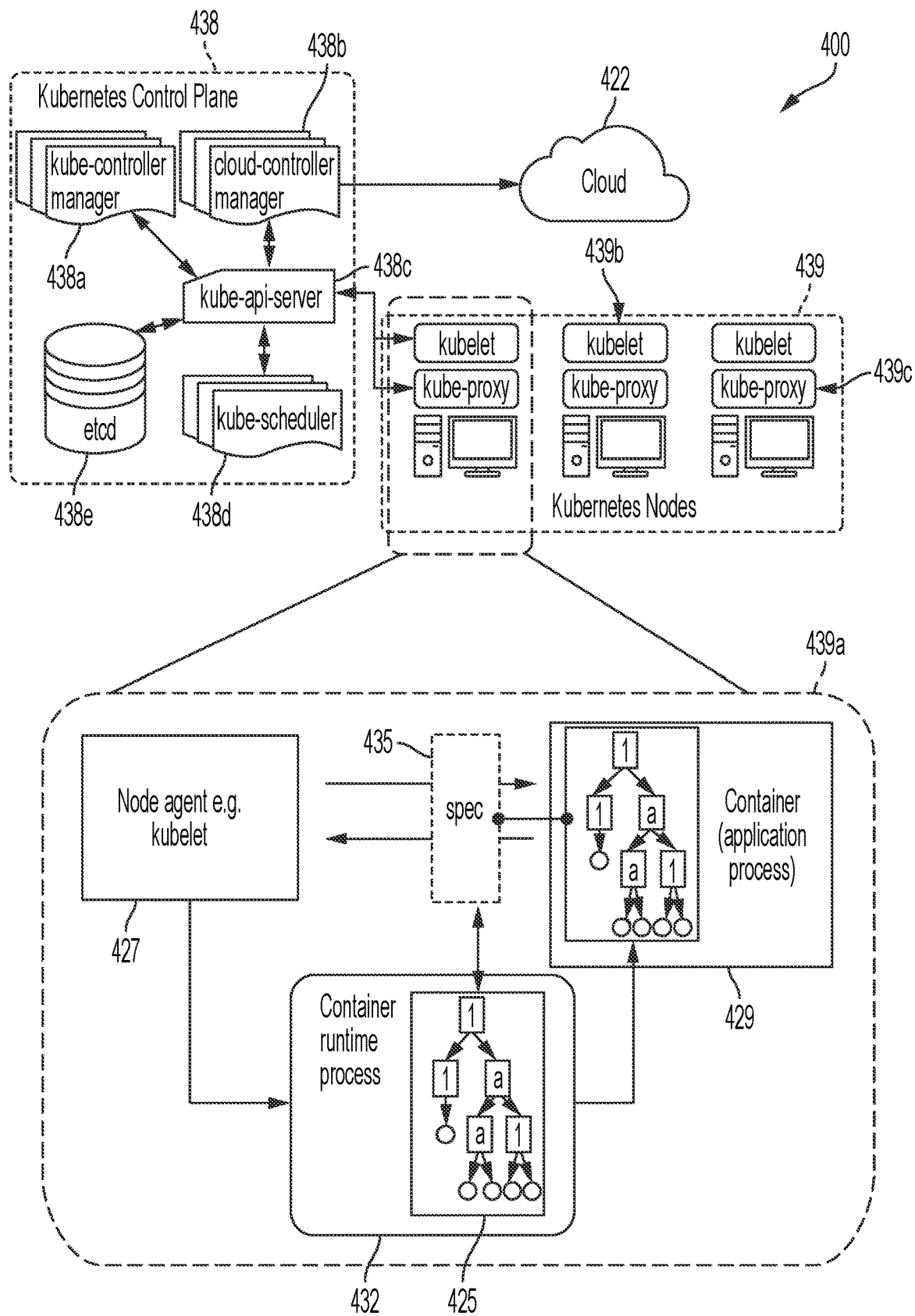
FIG. 4A illustrates a Kubernetes management system, in accordance with embodiments of the present invention.

FIG. 4A illustrates a Kubernetes management system 400, in accordance with embodiments of the present invention. Kubernetes management system 400 comprises a Kubernetes control plane/system 438, a cloud structure 422, and a Kubernetes node system 439. Kubernetes control plane/system 438 comprises a Kubernetes controller 438a, a cloud control manager component 438b, a Kubernetes server 438c, Kubernetes scheduler 438d, and an etc distributed (etcd) component 438e. etcd component 438e comprises a distributed key-value store providing a reliable means for storing data requiring access by a distributed system or cluster of machines. Kubernetes server 438c operationally controls functionality of Kubernetes node system 439 comprising nodes 439a . . . 439c. Each of nodes 439a . . . 439c comprises a node agent (i.e., a kublet) 427, specification code 435, a container 429, and a container runtime process 432. Each container runtime process comprises internal supervisor tree code 425 further illustrated via a detailed internal view 425a.

Specification code 435 enables an application developer to declare differing application status flags and associated container management health actions (e.g., stop container, restart container, pause traffic to container, restart traffic to container, etc.). When container runtime process 432 launches one or more containers defined for an associated pod executing on a node, the process 432 initiates supervisor tree code 425 and container application process 429 is executed under management of supervisor tree code 425. Subsequently, container runtime process marshal's internal container supervisor tree code 425 activity (e.g., restarting a child worker process (of processes 442a . . . 442n), disabling all child worker processes (of processes 442a . . . 442n), and restarting child worker processes (of processes 442a . . . 442n) with the external status action declaration). Likewise, an intra-pod-orchestrator component (enabled via specification code 435) orchestrates each container supervisor tree code instance to enable processes across different containers to be orchestrated and coordinated. Each node agent 427 is configured to performs container lifecycle management actions with respect to a status action declaration.

A configuration of a Kubernetes management instance set-up is described as follows:

The process is initiated when an application is deployed and managed by Kubernetes under a particular configuration (e.g., always run 3 instances of Pod X; set-up a password secret; and provision a storage volume). Subsequently, Kubernetes scheduler 438d assigns a pod to a node (e.g., a virtual or physical server) and creates containers for the pod (a pod may comprise one or more containers) using a container runtime process 432 comprising specified qualities. Container runtime process 432 is configured to create instances of application processes (e.g., container application process 429) such as starting a program on a computer. When container runtime process is invoked, it reads a definition (of specification code 435) associated with determining how specific endpoints of the container application process should be orchestrated by Kubernetes thereby causing the container runtime process to dynamically configure a supervisor tree definition embedded within an instance of the container application process. Subsequently, a container is launched as an application process. However, the application process is invoked as a set of parent and child system processes instantiated under the management of supervisor tree code 425.

Figure 4B:
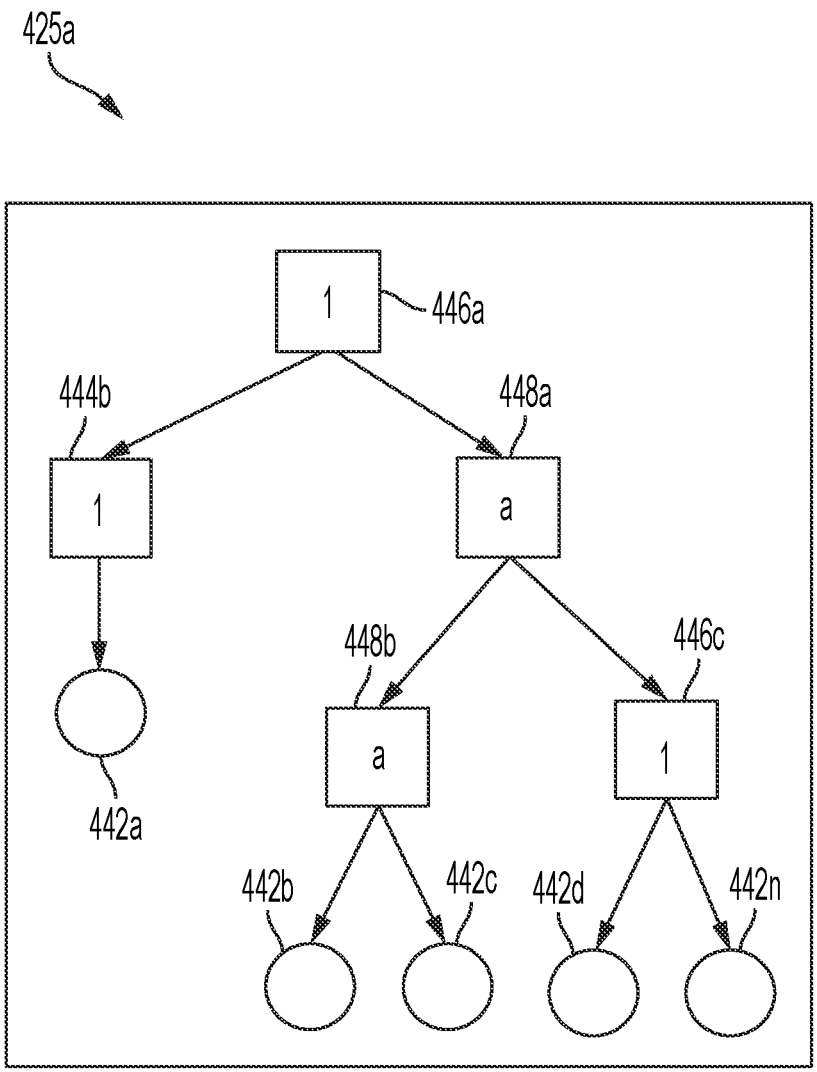
FIG. 4B illustrates an internal view of the supervisor tree code of the Kubernetes management system of FIG. 4A, in accordance with embodiments of the present invention.
Figure 4B:
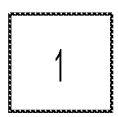
Figure 4B:
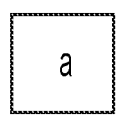
Figure 4B:

FIG. 4B illustrates an internal view of supervisor tree code 425 of Kubernetes management system 400 of FIG. 4A, in accordance with embodiments of the present invention. Within the application process (i.e., an instance of a container), supervisor tree code 425 is associated with rules by which child processes are operated as supervisors 446a . . . 446c and supervisors 448a and 448b or workers 442a . . . 442n. An embedded supervisor tree process (of supervisor tree code 425) comprises an external interface for translating state of system processes (within the application process) as governed by supervisor tree code 425. The external interface translates Kubernetes health orchestration actions into good, bad, or unknown states occurring with respect to system processes within a container. Likewise, a set of external management rules are dynamically created and a Kubernetes configuration of a management instance may operate as normal such that it is unaware that a dynamically created and embedded supervisor tree (code) is internally managing fine-grained system processes within the application and externally marshalling actions that Kubernetes is enabled to invoke within the container (e.g., stop, restart, etc.).

Figure 5:
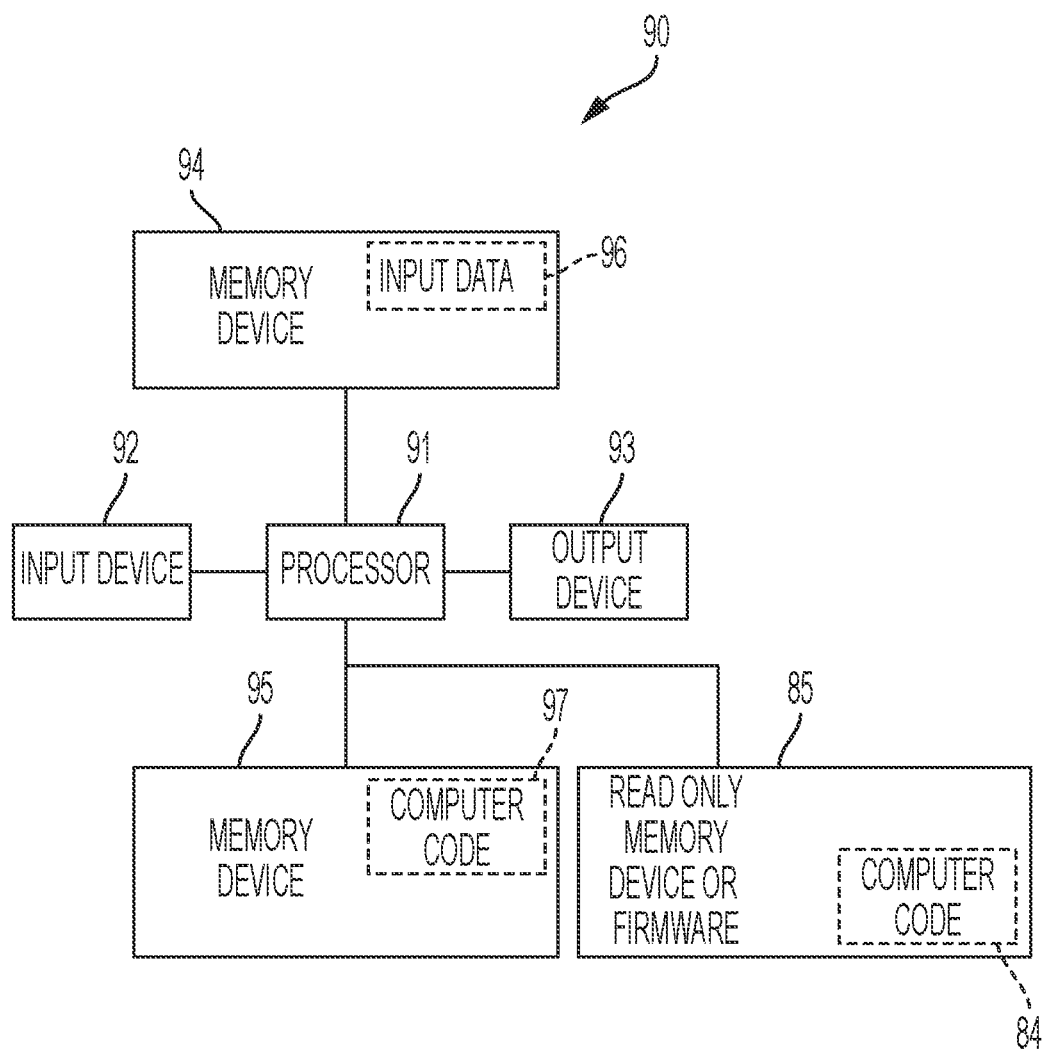
FIG. 5 illustrates a computer system used by the system of FIG. 1 for improving software and runtime technology associated with embedding supervisor tree code within a container runtime, enabling an associated container for operational functionality, and executing a container management instance with respect to the associated container, in accordance with embodiments of the present invention.

FIG. 5 illustrates a computer system 90 (e.g., Kubernetes control system 139 and controller scheduler device 138 of FIG. 1) used by or comprised by the system 100 of FIG. 1 for improving software and runtime technology associated with embedding supervisor tree code within a container runtime, enabling an associated container for operational functionality, and executing a container management instance with respect to the associated container, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software and runtime technology associated with embedding supervisor tree code within a container runtime, enabling an associated container for operational functionality, and executing a container management instance with respect to the associated container. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and runtime technology associated with embedding supervisor tree code within a container runtime, enabling an associated container for operational functionality, and executing a container management instance with respect to the associated container. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and runtime technology associated with embedding supervisor tree code within a container runtime, enabling an associated container for operational functionality, and executing a container management instance with respect to the associated container. In another embodiment, the invention provides a business method that performs the process steps of the invention on a subscription, advertising, and/or fee basis. That is, a service supplier, such as a Solution Integrator, could offer to enable a process for improving software and runtime technology associated with embedding supervisor tree code within a container runtime, enabling an associated container for operational functionality, and executing a container management instance with respect to the associated container. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
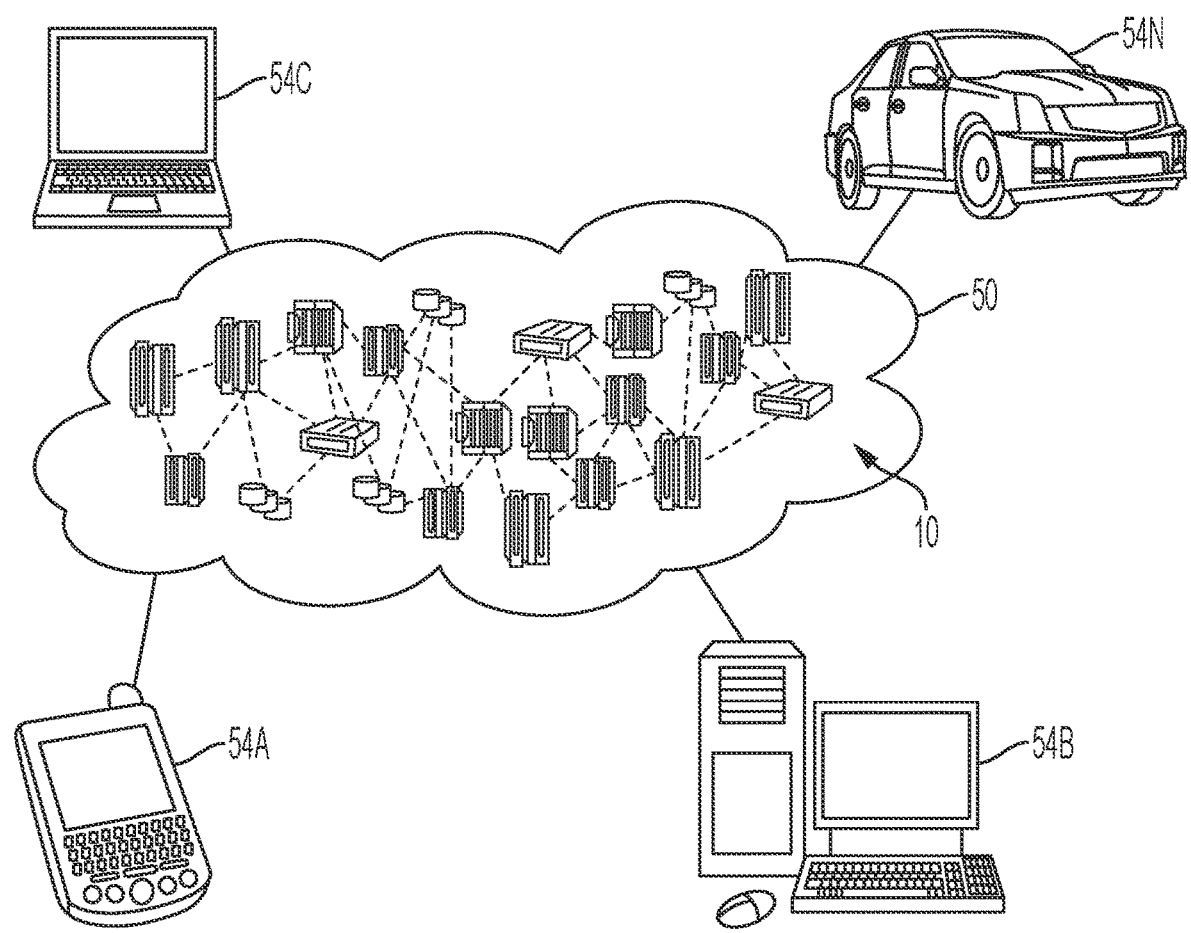
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 7:
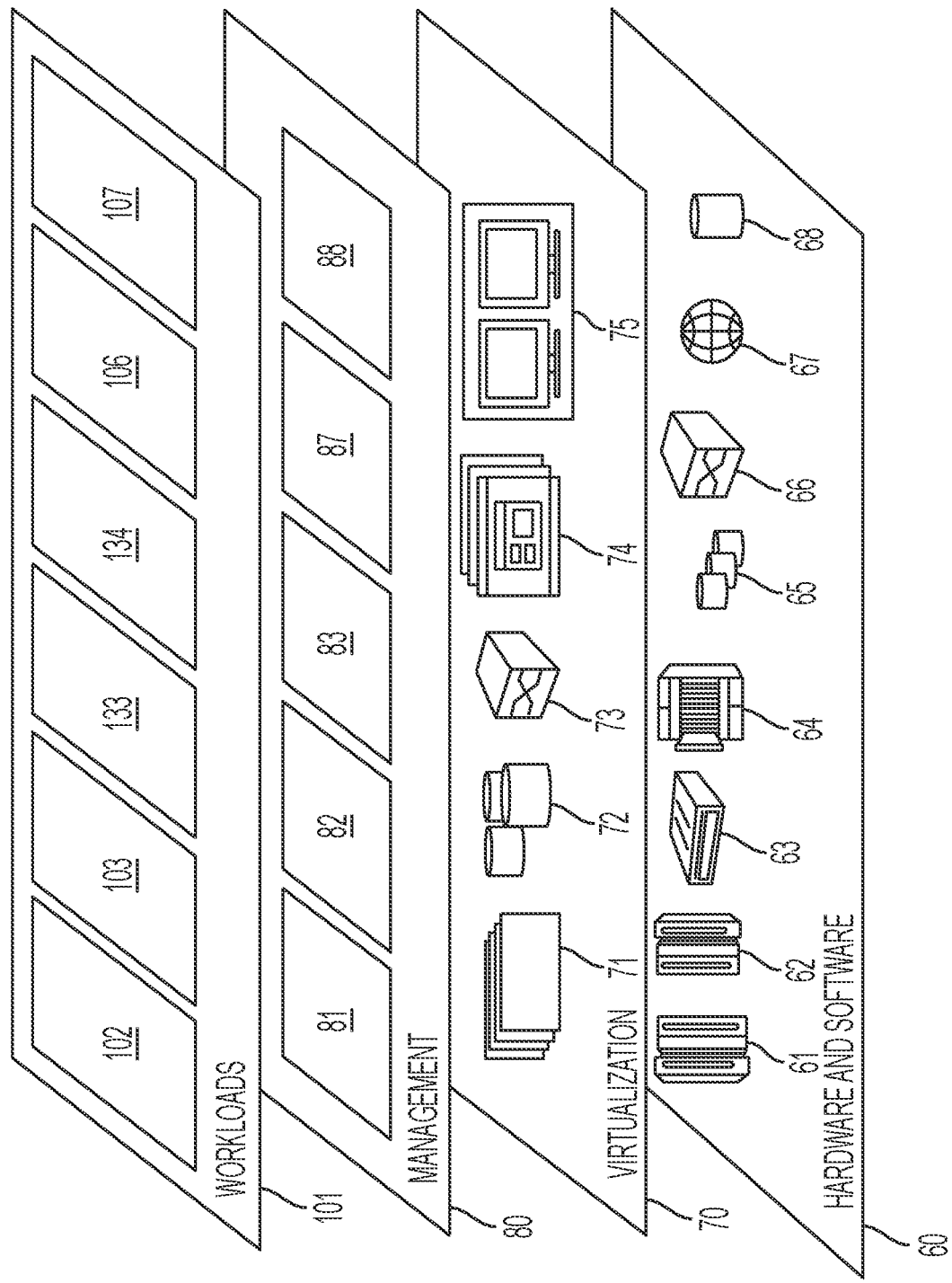
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software and runtime technology associated with embedding supervisor tree code within a container runtime, enabling an associated container for operational functionality, and executing a container management instance with respect to the associated container 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A container runtime optimization and execution method comprising:
enabling, by a processor of a controller hardware device, a container management instance;

enabling, by said processor in response to said enabling said container management instance, a container runtime comprising specified operational attributes associated with a container;

embedding, by said processor, supervisor tree code within said container runtime;

executing, by said processor in response to said enabling said container runtime, definition software describing specified digital endpoints of an associated application process being executed by said container;

enabling, by said processor in response to said executing said definition software, said container for operational functionality;

enabling, by said processor, an external interface for communications with said supervisor tree code;

executing, by said processor in response to a command received via said external interface, said container management instance with respect to said container.

2. The method of claim 1, wherein said container management instance is associated with a Kubernetes management system.

3. The method of claim 1, wherein said enabling said container management instance comprises:
deploying a software application with respect to a specified configuration for operation of said container runtime; and
assigning a pod of containers to a specified node.

4. The method of claim 3, wherein said specified node comprises a component selected from the group consisting of a virtual server and a physical server.

5. The method of claim 1, wherein said enabling said container runtime comprises:
generating application process instances associated with said container runtime.

6. The method of claim 1, wherein said executing said definition software comprises:
dynamically configuring said supervisor code for enabling said embedding.

7. The method of claim 1, wherein said enabling said container comprises:
executing, application process code with respect to a set of parent and child system processes instantiated with respect to management of said supervisor tree code; and
executing, via said supervisor tree code rules associated with child system processes of said set with respect to supervisors or workers of said set.

8. The method of claim 1, wherein said enabling said external interface comprises:
converting, via said external interface, associated operational actions to specified digital states associated with system processes running within said container.

9. The method of claim 1, further comprising:
providing at least one support service for at least one of creating, integrating, hosting, maintaining, and deploying computer-readable code in the controller hardware device, said code being executed by the processor to implement: said enabling said container management instance, said enabling said container runtime, said embedding, said executing definition software, said enabling said container, said enabling said external interface, and said executing said container management instance.

10. A computer program product, comprising a computer readable hardware storage device storing a computer readable program code, said computer readable program code comprising an algorithm that when executed by a processor of a controller hardware device implements a container runtime optimization and execution method, said method comprising:

enabling, by said processor, a container management instance;

enabling, by said processor in response to said enabling said container management instance, a container runtime comprising specified operational attributes associated with a container;

embedding, by said processor, supervisor tree code within said container runtime;

executing, by said processor in response to said enabling said container runtime, definition software describing specified digital endpoints of an associated application process being executed by said container;

enabling, by said processor in response to said executing said definition software, said container for operational functionality;

enabling, by said processor, an external interface for communications with said supervisor tree code;

executing, by said processor in response to a command received via said external interface, said container management instance with respect to said container.

11. The computer program product of claim 10, wherein said container management instance is associated with a Kubernetes management system.

12. The computer program product of claim 10, wherein said enabling said container management instance comprises:
deploying a software application with respect to a specified configuration for operation of said container runtime; and
assigning a pod of containers to a specified node.

13. The computer program product of claim 12, wherein said specified node comprises a component selected from the group consisting of a virtual server and a physical server.

14. The computer program product of claim 10, wherein said enabling said container runtime comprises:
generating application process instances associated with said container runtime.

15. The computer program product of claim 10, wherein said executing said definition software comprises:
dynamically configuring said supervisor code for enabling said embedding.

16. The computer program product of claim 10, wherein said enabling said container comprises:
executing, application process code with respect to a set of parent and child system processes instantiated with respect to management of said supervisor tree code; and
executing, via said supervisor tree code rules associated with child system processes of said set with respect to supervisors or workers of said set.

17. The computer program product of claim 10, wherein said enabling said external interface comprises:
converting, via said external interface, associated operational actions to specified digital states associated with system processes running within said container.

18. A controller hardware device comprising a processor coupled to a computer-readable memory unit, said memory unit comprising instructions that when executed by the processor implements a container runtime optimization and execution method comprising:

enabling, by said processor, a container management instance;

enabling, by said processor in response to said enabling said container management instance, a container runtime comprising specified operational attributes associated with a container;

embedding, by said processor, supervisor tree code within said container runtime;

executing, by said processor in response to said enabling said container runtime, definition software describing specified digital endpoints of an associated application process being executed by said container;

enabling, by said processor in response to said executing said definition software, said container for operational functionality;

enabling, by said processor, an external interface for communications with said supervisor tree code;

executing, by said processor in response to a command received via said external interface, said container management instance with respect to said container.

19. The controller hardware device of claim 18, wherein said container management instance is associated with a Kubernetes management system.

20. The controller hardware device of claim 18, wherein said enabling said container management instance comprises:

deploying a software application with respect to a specified configuration for operation of said container runtime; and assigning a pod of containers to a specified node.

* * * * *